Feb. 10, 1959     E. G. SORENSEN ET AL     2,873,065
DIFFERENTIAL ANALYZER

Filed Aug. 19, 1953     8 Sheets-Sheet 1

INVENTORS.
EARL G. SORENSEN
CARROLL M. GORDON
BY
Roland A. Anderson
ATTORNEY.

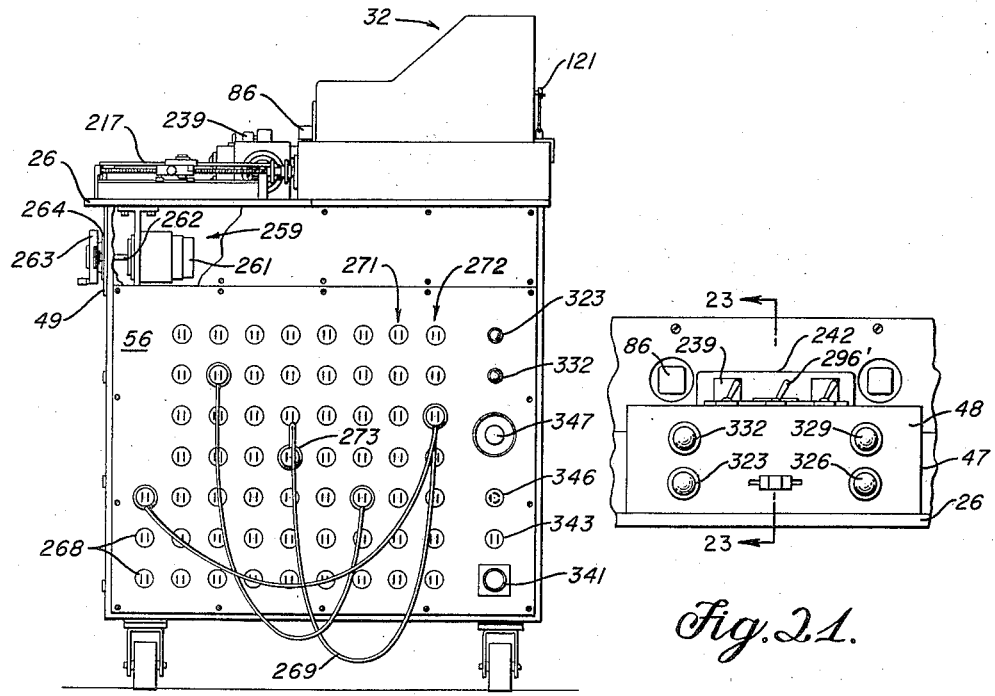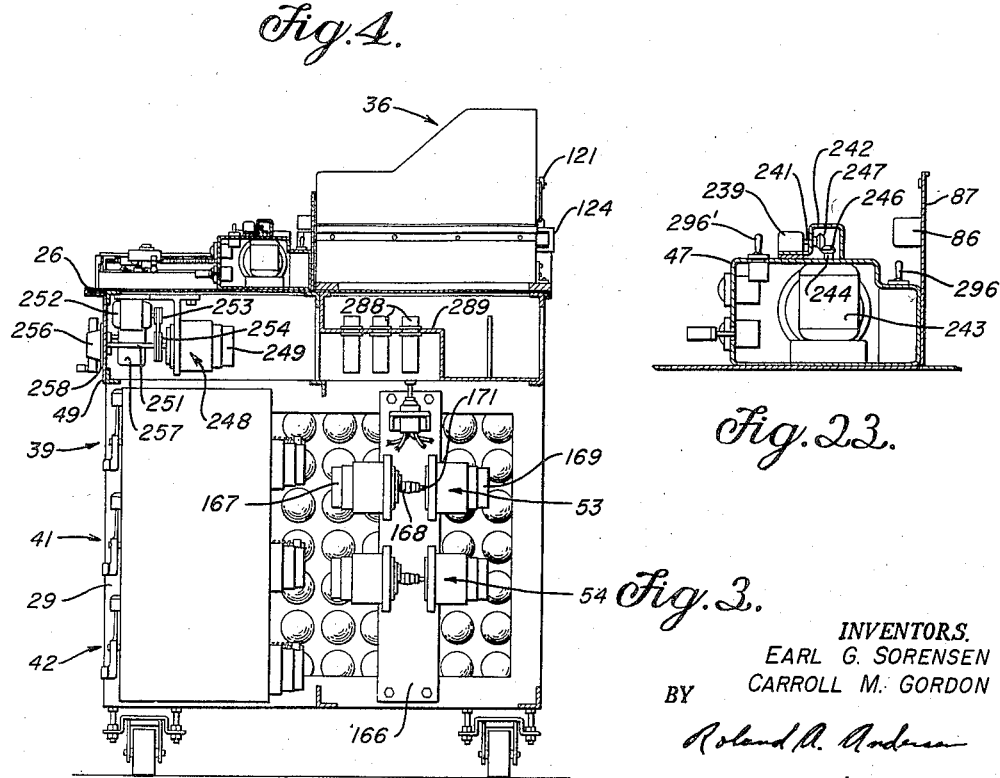

Feb. 10, 1959    E. G. SORENSEN ET AL    2,873,065
DIFFERENTIAL ANALYZER
Filed Aug. 19, 1953    8 Sheets-Sheet 3
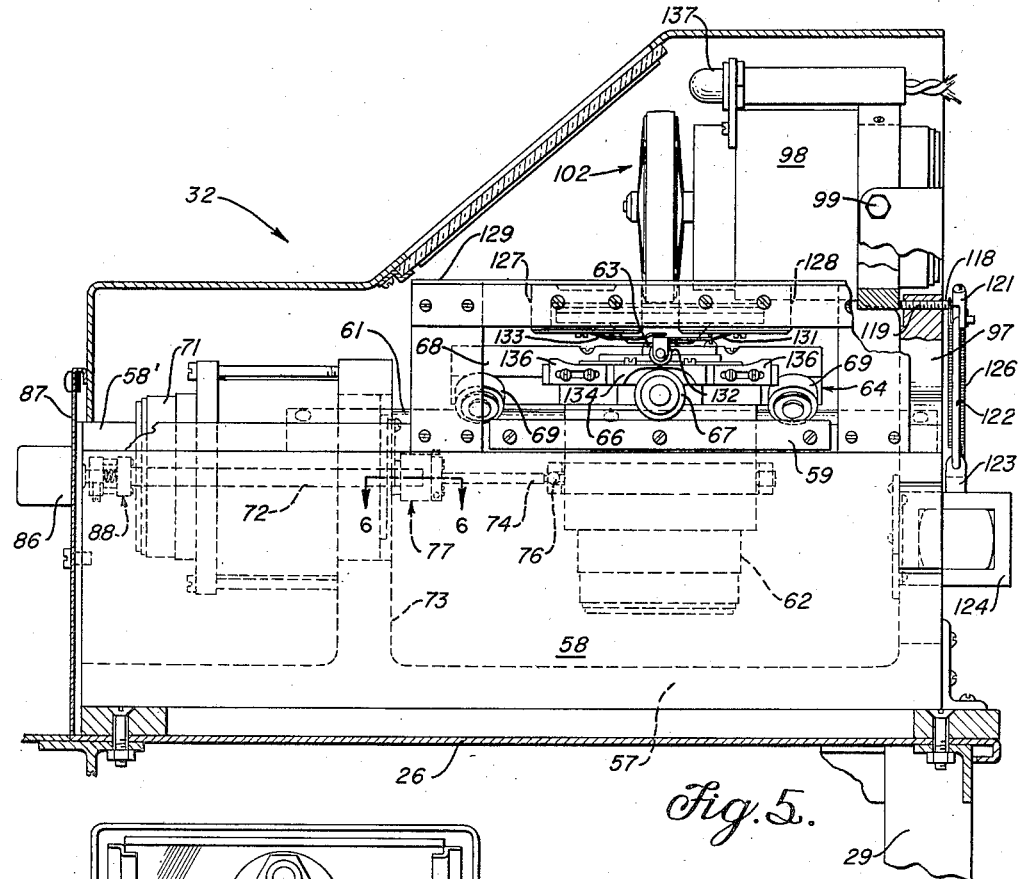
Fig. 5.
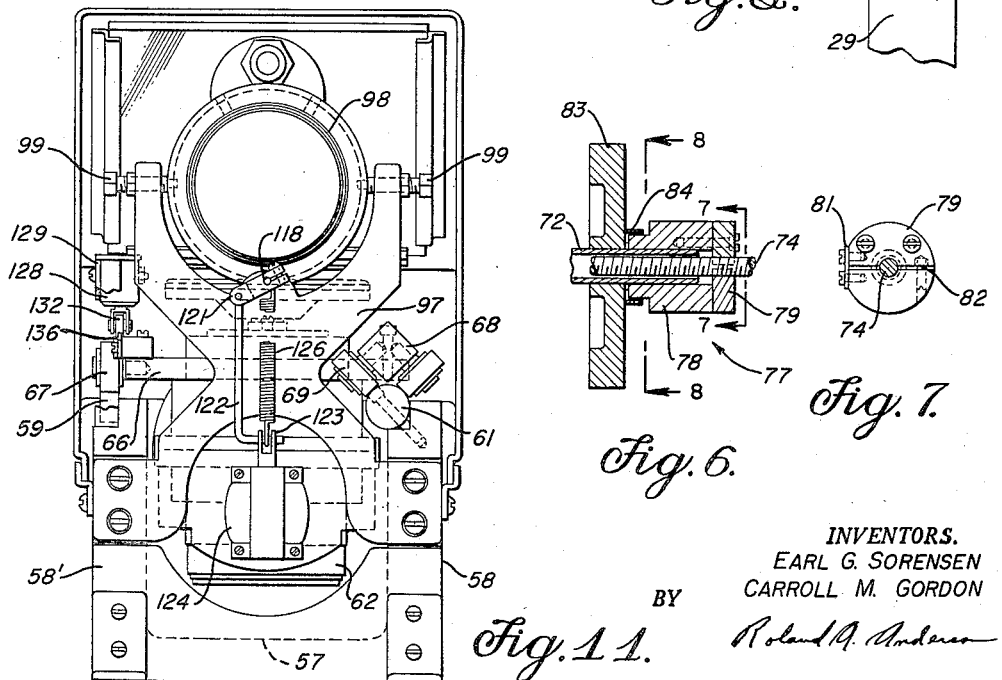
Fig. 6.   Fig. 7.
Fig. 11.
INVENTORS.
EARL G. SORENSEN
CARROLL M. GORDON
BY Roland A. Anderson
ATTORNEY.

Feb. 10, 1959     E. G. SORENSEN ET AL     2,873,065
DIFFERENTIAL ANALYZER
Filed Aug. 19, 1953     8 Sheets-Sheet 4

INVENTORS.
EARL G. SORENSEN
CARROLL M. GORDON
BY
Roland A. Anderson
ATTORNEY.

Feb. 10, 1959 E. G. SORENSEN ET AL 2,873,065
DIFFERENTIAL ANALYZER
Filed Aug. 19, 1953 8 Sheets-Sheet 5
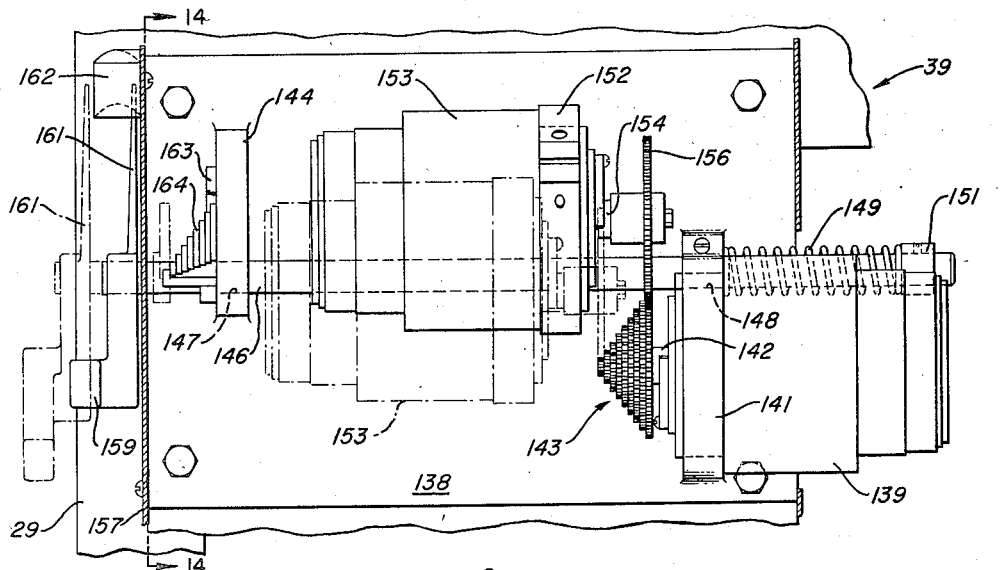
Fig. 12.
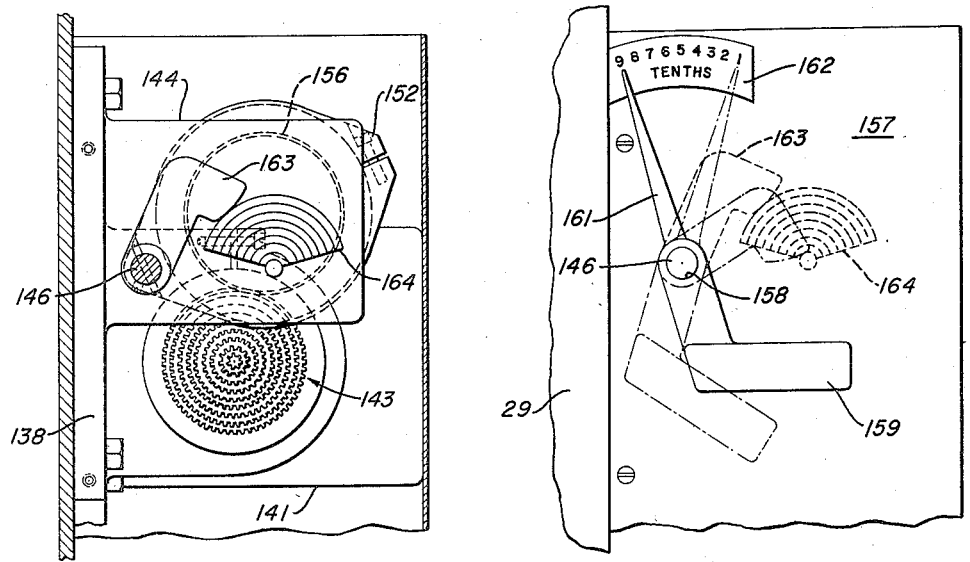
Fig. 14.
Fig. 13.
INVENTORS.
EARL G. SORENSEN
CARROLL M. GORDON
BY
Roland R. Anderson
ATTORNEY.

Feb. 10, 1959 E. G. SORENSEN ET AL 2,873,065
DIFFERENTIAL ANALYZER
Filed Aug. 19, 1953 8 Sheets-Sheet 6
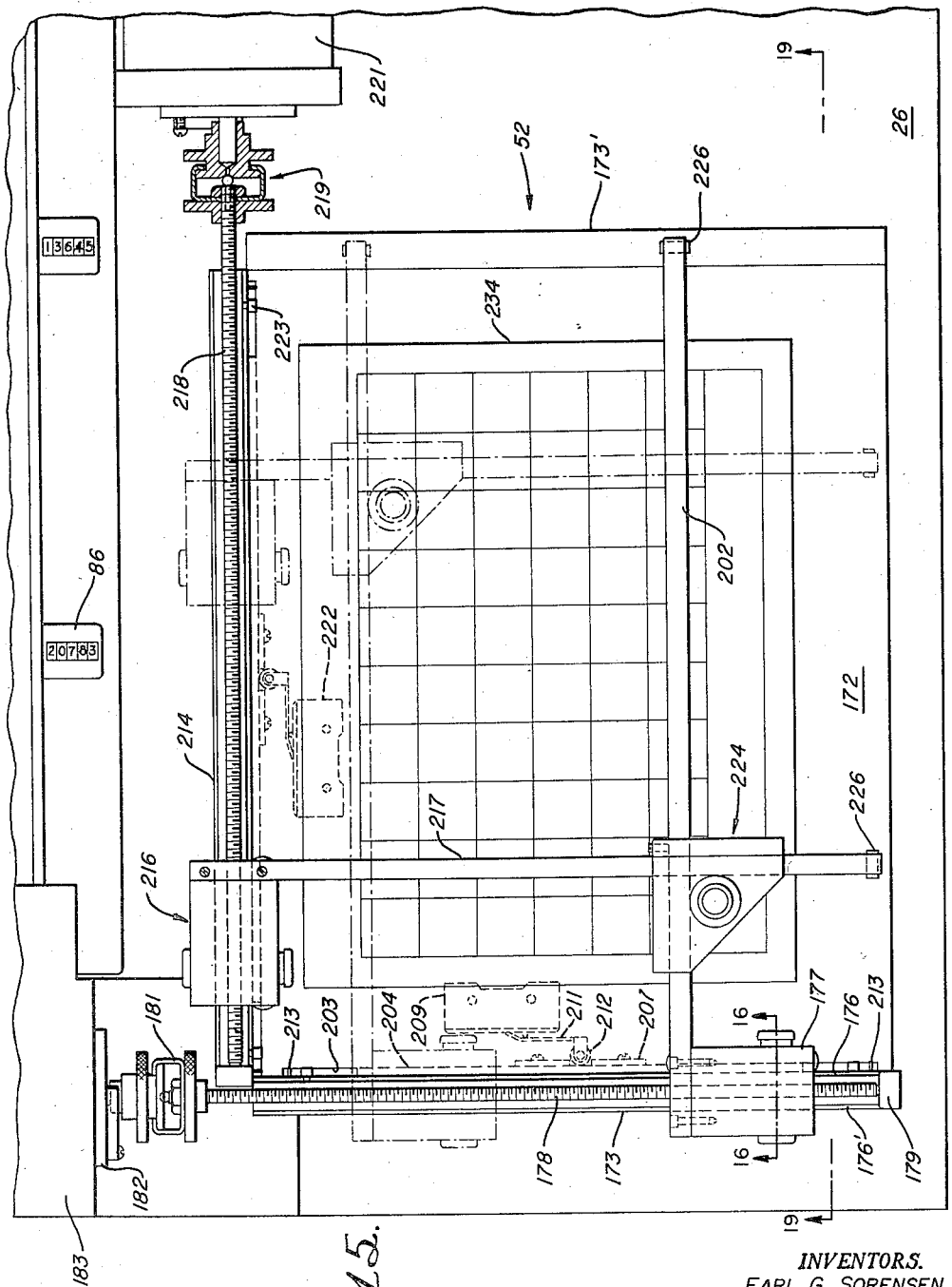
INVENTORS.
EARL G. SORENSEN
CARROLL M. GORDON
BY
Roland A. Anderson
ATTORNEY.

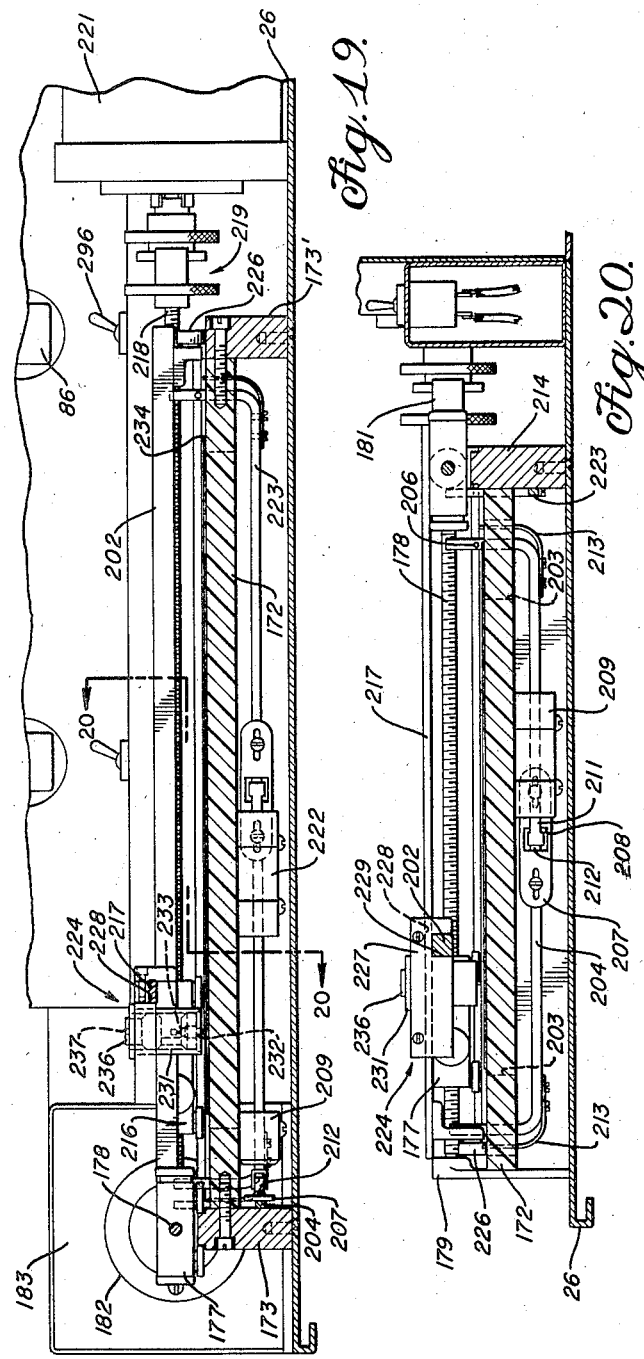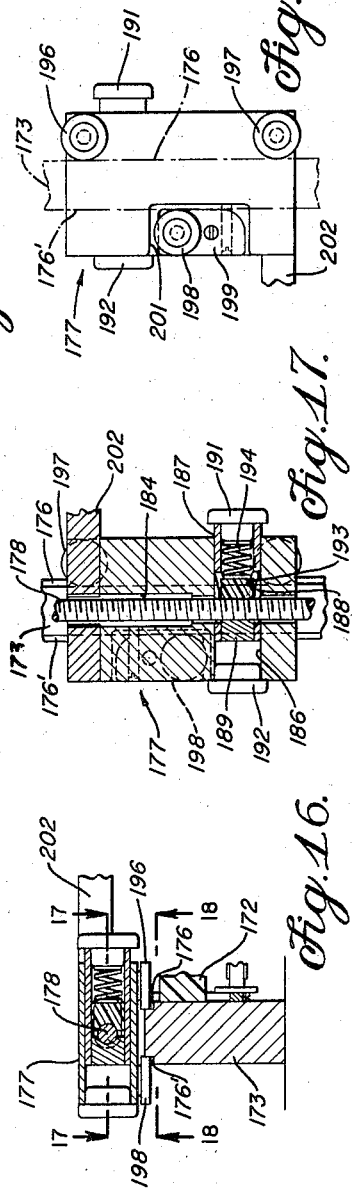

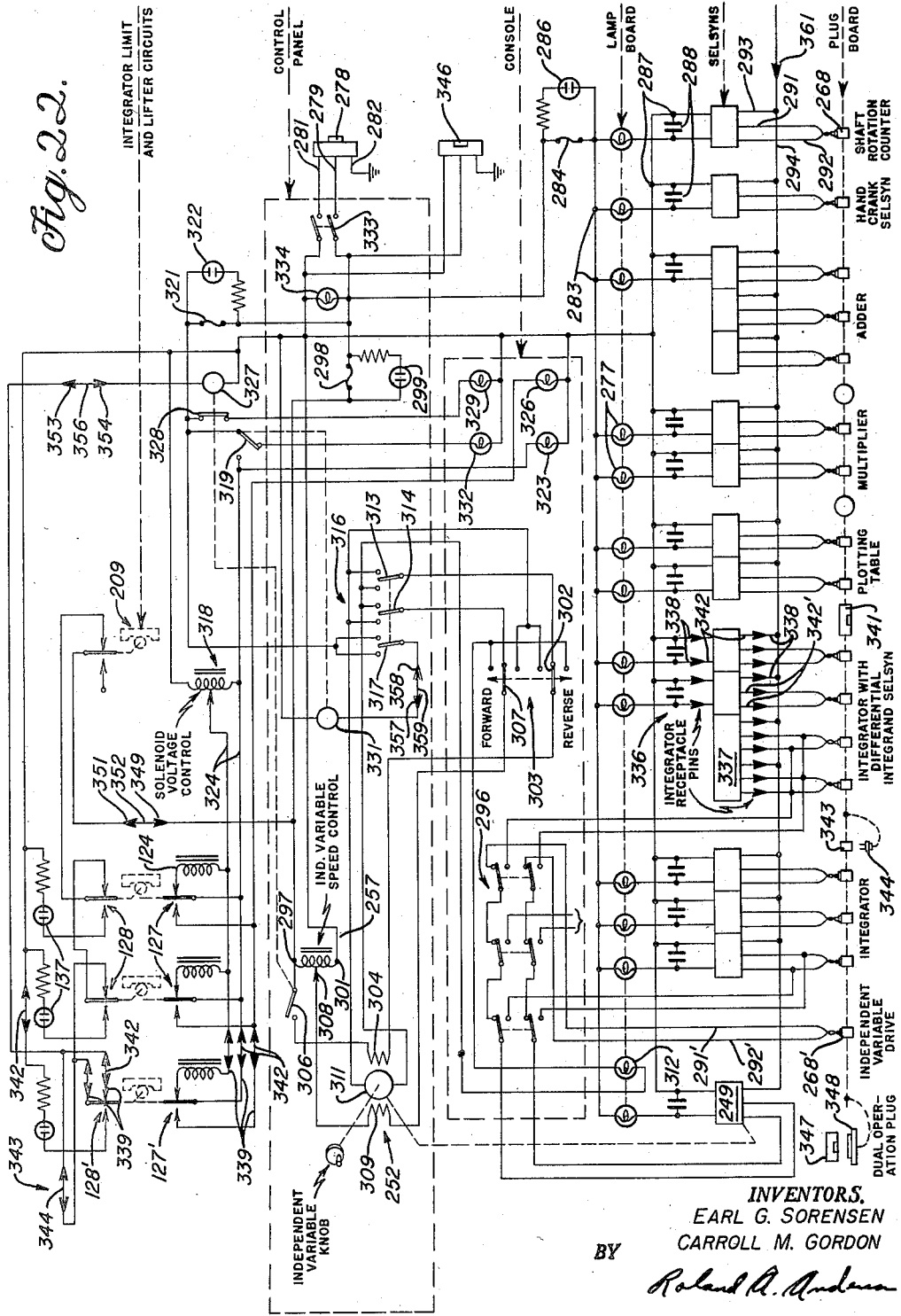

United States Patent Office 2,873,065
Patented Feb. 10, 1959

2,873,065

DIFFERENTIAL ANALYZER

Earl G. Sorensen, Albany, and Carroll M. Gordon, San Pablo, Calif., assignors to the United States of America as represented by the United States Atomic Energy Commission Application August 19, 1953, Serial No. 382,497

14 Claims. (Cl. 235—182)

The present invention relates to improvements in analogue computing machines of the differential analyzer class.

In order to expedite the mathematical computations associated with scientific and engineering research, a variety of mechanical computers have been developed. One such computer, the differential analyzer, is primarily adapted to evaluate differential equations. The analyzer is used for the numerical evaluation of equations in which all coefficients have known values and for which all numerical conditions are known, and is particularly used for those equations having no known formal solution. The theoretical principles governing the operation of a mechanical differential analyzer have been known for many years and are amply set forth in the literature. Inasmuch as the design of such a machine is necessarily complex and presents many mechanical problems, the extensive development of practical apparatus is relatively recent.

In general form, the analyzer embodies a plurality of basic computer mechanisms for performing integration, multiplication, and addition, and means for directing the result of any one operation to another computer mechanism performing a further operation. In the device, numerical quantities are represented by the rotation of shafts, or the electrical equivalent of shafts. Thus addition is achieved by causing an input shaft to rotate an amount corresponding to one addend, causing a second input shaft to rotate an amount corresponding to a second addend, and providing mechanism whereby an output shaft will rotate an amount equal to the sum of the rotations of the two input shafts.

Similarly, multiplication is accomplished by causing an input shaft, rotating an amount representing the multiplicand, to drive an output shaft, representing the product, through a constant drive ratio representing the multiplier. Integration is performed by an input shaft, representing the independent variable, driving an output shaft, representing the integral, through a variable and controllable drive ratio representing the integrand. In each of these operations, the quantity represented by a given rotation of an input shaft is known, and therefore, the solution of the operation is determinable from the amount of rotation of the output shaft.

An equation to be solved may be expressed in integral form and will then consist of one or more terms to be evaluated and summed by an appropriate combination of computer mechanisms. Accordingly, it will be necessary to couple the output shaft of each computer mechanism performing an operation with an input shaft of a mechanism performing a further operation. Chosing, for an example, the case of an expression consisting of two simple integrals to be added, the output shafts of two integrators will be coupled to the input shafts of an adder in order to produce a summation of terms.

It will be apparent that the pattern of coupling between shafts of the various computer mechanisms will be dictated by the particular mathematical expression to be evaluated, and will vary in each case. Accordingly, a convenient means of switching shaft connections is required. It will be further apparent that an independent drive means is necessary to set the system of interlocked computer shafts into motion and that provision must be made to define the limits between which the equation is to be evaluated.

While in many instances the analyzer can be made to generate standard mathematical functions internally, it is customary to provide input means for continuously feeding a function into an integrator mechanism as the process of evaluation is carried out. Similarly, a means of recording the result is required, such recording means usually comprising a plotting table adapted to graph the relationship between two shaft rotations or a cyclometric counter adapted to register the output shaft revolutions.

A foremost problem in the design of mechanical differential analyzers stems from the structure of the integrators. In such mechanisms, the independent variable shaft and the integral shaft are mutually perpendicular and a coaxial disc secured to the extremity of the former drives a coaxial wheel attached to the latter. A lead screw, or equivalent mechanism, is adapted to translate one shaft with respect to the other in order to vary the drive ratio in accordance with the integrand of the expression undergoing evaluation. Irrespective of the exact structure, a relatively loose friction drive is necessarily present. Inasmuch as the integral, or output, shaft must sustain a load by virtue of being coupled with an input shaft of a further computer mechanism, a possibility of slippage exists.

At various stages in the development of the differential analyzer, mechanical torque amplifiers and specialized synchronous electrical devices have been employed to provide a slipless link between computer shafts, the latter devices being more common on recent apparatus. In an analyzer of appreciable size the inclusion of some such means is highly desirable.

An integrator mechanism of the described class is a compromise with the theoretically ideal design. It is recognized in theoretical treatments that the most accurate structure would comprise a vertical, independent-variable, shaft having a coaxial drive disc secured to its upper extremity and, as output means, a free-rolling sphere disposed on the disc. From the standpoint of kinematics and accuracy, such a mechanism would give best results. However the difficulty of providing means to control the position of the sphere and to adapt it to turn an output shaft without a corresponding restriction of freedom of motion has heretofore resulted in the compromise structure in which a wheel is rigidly mounted to the output shaft and substituted for the sphere.

The capacity of an analyzer, or the degree to which complex expressions may be handled, is largely determined by the number of basic computer elements, primarily the number of integrators. Accuracy will be dependent upon the amount of slippage and lost motion in mechanical linkages and the backlash in electrical connections. Simplicity is advantageous to the extent that it is compatible with the previous objectives.

Finally, the utility of the analyzer for general applications will be in part dependent on flexibility of the means for interconnecting the computer elements. The term flexibility is here used to indicate the degree to which varied and diverse connections can be made between the input and output shafts of computer mechanisms, and the ease with which such connections can be made.

Now it has been found that flexibility may be maximized and the problem of torque amplification resolved by coupling all input and output shafts of the computer elements with the rotors of self-synchronous electrical motors, hereinafter referred to as selsyns. By providing a plugboard having mounted thereon the stator terminals of the selsyns, any shaft in the machine may be readily patched to any other, and through the use of certain advancements to be herein set forth, shafts of one analyzer may be coupled to shafts of a duplicate machine resulting in a substantial doubling of capacity.

The present invention employs a novel integrator mechanism in which the desirable characteristics of the theoretical free-rolling sphere mechanism are simulated. Certain further improvements in accessory components provide a substantial increase in accuracy in conjunction with relative simplicity, durablity, and ease of operation.

It is therefore an object of this invention to provide an improved analogue computing machine of the differential analyzer class.

It is also an object to provide a differential analyzer having improved computer elements for performing basic mathematical operations and improved means for producing a coaction of said computer elements to perform compound mathematical operations.

It is a further object to provide a differential analyzer having simplified and more flexible means for the interconnection of various computer elements to accomplish the evaluation of differential equations.

It is an important object of the present invention to provide a differential analyzer having a structure such that a duplicate analyzer may be readily operated in conjunction with the first for the purpose of evaluating more complex expressions.

Yet another object is to provide improved provisions whereby a remotely situated integrator mechanism may be coupled with a differential analyzer to increase the capacity of the computer.

Still a further object of the present invention is to provide an integrator mechanism adapted to simulate the advantages, and overcome the disadvantages, of the theoretical free-rolling sphere mechanism.

In addition, it is an object of the present invention to provide a differential analyzer having improved input, output, drive, safety, and control means.

The invention, both as to its organization and method of operation, together with further objects and advantages thereof, will best be understood by reference to the following specification taken in connection with the accompanying drawing, of which:

Figure 3 is a cross-sectional view taken along line 3—3 of Figure 1;

Figure 4 is an end elevation of the analyzer showing the plugboard means by which the various component elements are electrically connected for problem solution;

Figure 5 is a cross-sectional elevation view of a typical integrator unit;

Figure 6 is a cross-sectional view taken along line 6—6 of Figure 5;

Figure 7 is an end view of the mechanism shown in Figure 6 taken along line 7—7 thereof;

Figure 11 is an end elevation of the integrator unit shown in Figure 5;

Figure 12 is an elevational view taken along line 12—12 of Figure 1 showing the structure of a typical multiplier unit;

Figure 13 is an end view of the multiplier unit shown in Figure 12;

Figure 14 is a cross-sectional view of the multiplier unit taken along line 14—14 of Figure 12;

Figure 15 is a plan view of a plotting table for introducing data into the analyzer and for recording the output thereof;

Figure 16 is a cross-sectional view taken along line 16—16 of Figure 15;

Figure 17 is a cross-sectional view taken along line 17—17 of Figure 16;

Figure 18 is a view taken along line 18—18 of Figure 16 in which the structure of the mechanism is clarified;

Figure 19 is a cross-sectional elevation view taken along line 19—19 of Figure 15;

Figure 20 is a cross-sectional view taken along line 20—20 of Figure 19;

Figure 21 is an elevational view of the console portion of the analyzer showing the control and safety means mounted thereon;

Figure 22 is a schematic diagram showing the electrical connections between the various elements of the analyzer and showing the safety and control means therefor; and Figure 23 is a cross-sectional view taken along line 23—23 of Figure 21 in which means for recording numerical quantities is shown.

Figure 1:
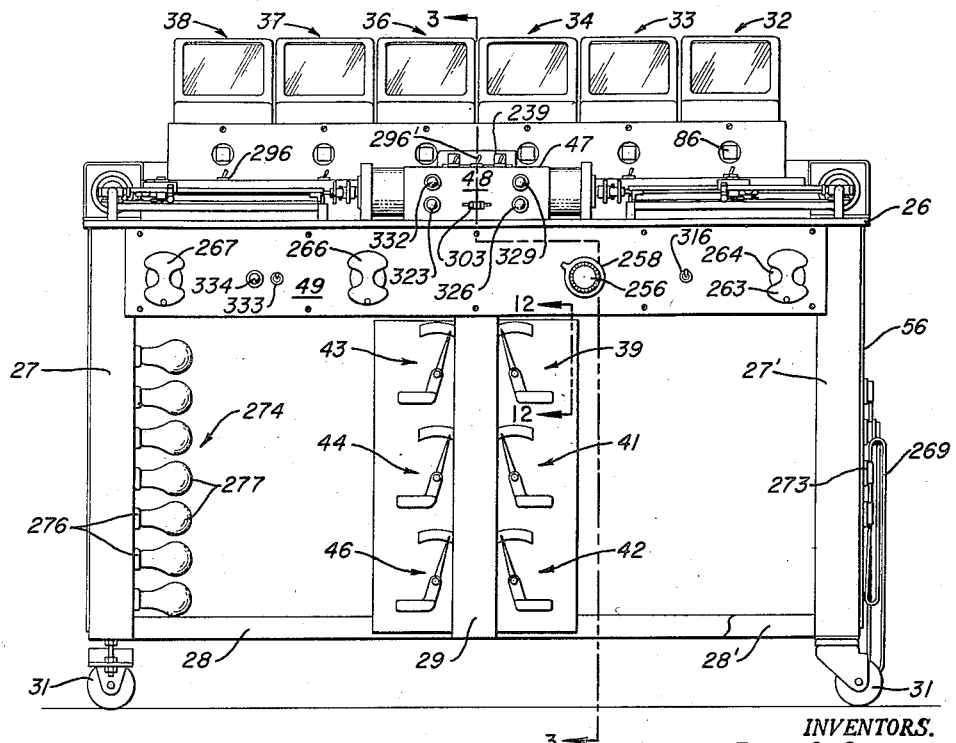
Figure 1 is a front elevation view of the analyzer showing the disposition of the component elements.

Referring directly to the drawings for a more detailed discussion and description of the invention and particularly to Figure 1 thereof, there is provided a rectangular table 26 supported by vertical end panels 27 and 27'. A brace 28 extends between the central lower extremities of end panels 27 and 27', and a rear brace 28' is similarly disposed between the lower rear corners. Vertical rectangular framework 29 is secured to the underside of table 26 midway between end panels 27 and 27' and rests upon the braces 28 and 28'. Disposed beneath each lower corner of end panels 27 and 27' is a caster 31.

Integrator units 32, 33, 34, 36, 37, and 38, to be hereinafter described, are disposed in a row on the rearmost portion of table 26, the row being aligned parallel with the rearmost edge of the table and with integrator 32 most adjacent end panel 27'. Multipliers 39, 41, and 42, and multipliers 43, 44, and 46, are disposed in two vertical columns on either side of the forward portion of framework 29 with the former three multipliers 39, 41, and 42 being on that side of the framework 29 which faces end panel 27'.

A rectangular counter housing 47 is centrally disposed on table 26 in front of the centrally located integrators 34 and 36, and console panel 48 is mounted on its forward face. Control panel 49 is disposed between end panels 27 and 27' immediately below the forward edge of table 26. As better shown in Fig. 2, first plotting table 51 and second plotting table 52, to be hereinafter described, are disposed on the front corners of table 26 with plotting table 51 being forward from end integrator 32 and plotting table 52 being forward from the other end integrator 38.

There are provided two adders 53 and 54, as illustrated in Fig. 3, mounted in a vertical column upon framework 29 to the rear of multipliers 39, 41, and 42. Two additional adders (not shown) are similarly disposed on the opposite side of framework 29. A rectangular plugboard 56, to be hereinafter described, is mounted on the outer face of end panel 27, as shown in Fig. 4.

Each of the plurality of integrator units 32–34 and 36–38 is similar in construction to the others and only one integrator unit 32 will be described in detail. Such typical integrator unit 32 employs the principle wherein a driving shaft coacts with a driven shaft through a variable and controllable drive ratio. In such a mechanism a mathematical expression may be integrated over a given interval by rotating the driving shaft an amount representing the interval, and maintaining the drive ratio at each instant proportional to the value of the expression at that instant. Under such circumstances, the driven shaft will rotate an amount equal to the value of the expression integrated over the stated interval and multiplied by a constant which is determinable from the dimensions of the mechanism.

A channel shaped base member 57, as illustrated in Figs. 5 and 11, is suitably secured to table 26 with arms 58 and 58' projecting upward and aligned perpendicular to the rearmost edge of the table. Arms 58 and 58' are rabbeted along their upper extremity with an elongated flat trolley way 59 disposed on one arm 58 and cylindrical trolley way 61 disposed on the other arm 58'.

An independent-variable selsyn 62 having its rotor shaft 63 projecting upward is carried between ways 59 and 61 by a trolley assembly 64. Trolley 64 comprises an annular motor mounting 66, having the independent-variable selsyn 62 coaxially secured within its central bore, disposed above and between ways 59 and 61. Trolley wheel 67 is rotatably secured to the edge of mounting 66 and adapted to ride upon flat way 59. Secured to the point on mounting 66 opposite from wheel 67 is an elongated arm 68 of rectangular cross-section; arm 68 being disposed above and parallel to cylindrical way 61 and in such a manner that its major surfaces are inclined 45° with respect to the plane of mounting 66. A trolley wheel 69 is rotatably secured to each extremity of the two lower faces of arm 68, each wheel being parallel to the inclined surface of arm 68 to which it is secured and being adapted to ride upon cylindrical way 61. It will be observed that the use of inclined wheels riding on a cylindrical way will impart a self-centering action to the trolley assembly 64.

In order to control the displacement of trolley 64, and thus independent-variable selsyn 62, an integrand selsyn 71, having a hollow rotor shaft 72, is disposed within the forward portion of base member 57. A suitable support 73 secures integrand selsyn 71 in such position that rotor shaft 72 is horizontal and directed at independent-variable selsyn 62. A threaded lead screw 74 is disposed on the axis of integrand selsyn 71, one extremity extending within rotor shaft 72 and the opposite extremity being secured to independent-variable selsyn 62 by a flexible coupling 76.

Figure 8:
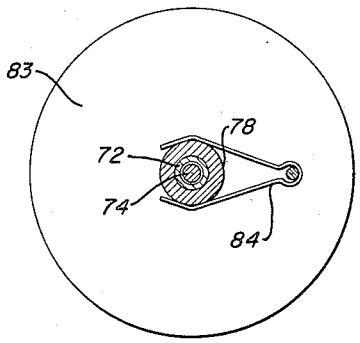
Figure 8 is a cross-sectional view taken along line 8—8 of Figure 6.

As better shown in Fig. 6, a threaded coupling assembly 77 is secured to the extremity of rotor shaft 72 and engages the lead screw 74. Coupling 77 comprises hollow cylindrical body member 78 coaxially secured to rotor shaft 72 and projecting outward therefrom, and a split nut 79, one half of nut 79 being secured to body member 78 in threaded engagement with lead screw 74, the remaining segment of nut 79 being secured to the first half by flexible fastener 81 and adjustable set-screw 82, as shown in Fig. 7. A flywheel 83 (see Fig. 6) is rotatably mounted on rotor shaft 72 between integrand selsyn 71 and coupling 77 and carries a resilient friction clip 84, as shown in Fig. 8, which is adapted to clasp coupling 77 and exert an oscillation damping drag thereon.

To record revolutions of the integrand shaft 72, counter 86 (see Fig. 5) is mounted on front plate 87 which covers the forward faces of the integrator units. Counter 86, of the conventional digital type, is coupled with rotor shaft 72 by flexible coupling 88 and is adapted to convert recorded revolutions into an indication of the displacement of trolley assembly 64 from a central reference point.

Figure 9:
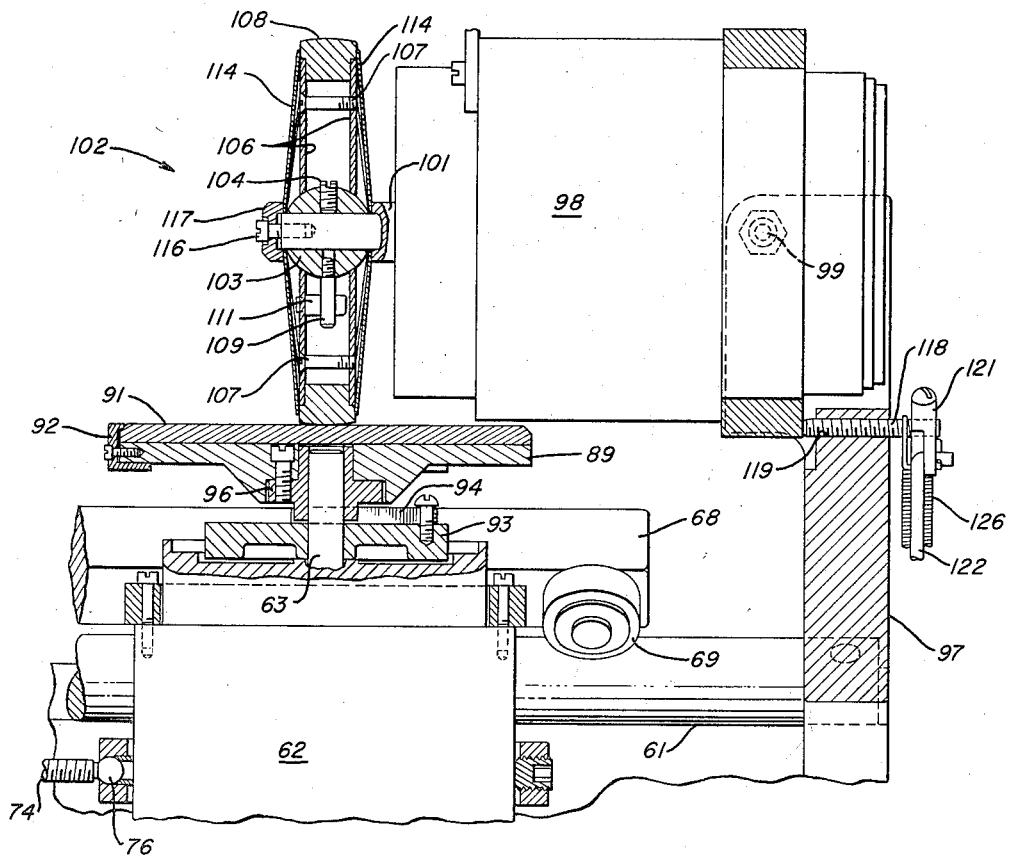
Figure 9 is a cross-sectional view of a portion of an integrator unit in which the structure thereof is further clarified.

An independent-variable drive disc 89 is coaxially secured to the upper extremity of independent-variable selsyn rotor shaft 63, as illustrated in Fig. 9. Circular wear plate 91 is coaxially and detachably fastened to the upper surface of drive disc 89 by a plurality of clamps 92. A flywheel 93 is rotatably disposed on rotor shaft 63 beneath drive disc 89 and carries a resilient friction clip 94 which grips a downwardly projecting sleeve 96 secured to the drive disc and exerts an oscillation damping drag thereon, as was set forth for the previously-described flywheel 83.

An upwardly projecting yoke 97 is secured to the rear face of base member 57 (see Figs. 5 and 9) and mounts integral selsyn 98, the selsyn 98 being pivotably secured between the arms of the yoke by means of opposed pins 99 and disposed so that its rotor shaft 101 extends forward over drive disc 89. Coaxially secured to the forward extremity of rotor shaft 101 is integral wheel 102 which is adapted to contact and be driven by the upper surface of wear plate 91. As will be described, the integral wheel 102 is designed to simulate the kinematic characteristics of an unconstrained sphere in order that the integrator unit will approximate the performance of a theoretically ideal mechanism.

Within integral wheel 102 a spherical ball element 103 is secured to the forward extremity of rotor shaft 101 by a set-screw 104. Two centrally apertured circular diaphragms 106 are disposed on ball element 103 by enclosure of a portion of the ball within their central apertures, the diaphragms being parallel, generally coaxial with rotor shaft 101, and on opposite sides of the ball. A plurality of threaded fasteners 107 pass between the diaphragms 106 adapting the diaphragms to swivel as a unit about ball 103. An annular tire 108, the periphery of which is a generated central section of a sphere, is concentrically disposed between the peripheries of diaphragms 106 and is adapted to contact wear plate 91. To confine wear to the more replaceable element, tire 108 is hardened to a greater degree than wear plate 91.

Figure 10:
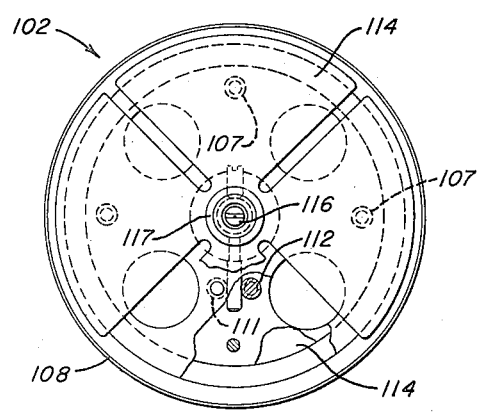
Figure 10 is a partially broken-out view of a portion of the integrator mechanism shown in Figures 5 and 9.

A pin 109 projects from ball 103 between diaphragms 106 and extends between two adjacent pegs 111 and 112 (see Fig. 10), one peg being secured to each diaphragm. Integral wheel 102 is thus constrained to rotate with integral selsyn rotor shaft 101 while being free to rotate about any axis normal to the rotor shaft. As better shown in Fig. 10, two dished circular springs 114 are coaxially disposed on rotor shaft 101 on either side of ball 103 and bear against tire 108 in such a manner as to provide a force tending to restore wheel 102 to perpendicularity with respect to the rotor shaft 101. Threaded fastener 116 transpierces a cap 117 and enters the extremity of rotor shaft 101 thus securing the wheel assembly 102 thereto.

There is provided safety and control mechanism for preventing drive disc 89 from over-riding wheel 102 and for disengaging the wheel from the plate 91 during initial set-up, as illustrated in Figs. 5 and 11. Threaded cylindrical lifter shaft 118 is threadably engaged within an aperture 119 which transpierces yoke 97 in such a position that the forward extremity of the shaft 118 abuts against the lower rear portion of integral selsyn 98. Rotation of shaft 118, causing it to advance within aperture 119, will exert pressure against integral selsyn 98 to pivot the selsyn upward and disengage wheel 102 from wear plate 91. As better shown in Figure 11, a lever arm 121 is perpendicularly secured to the rear extremity of lifter shaft 118 and lifter rod 122 is suspended from the extremity of the arm. The lower end of rod 122 is secured to the armature 123 of a vertical solenoid 124 which is suitably mounted on yoke 97 beneath the lifter shaft 118. It will be seen that activation of the solenoid 124 will rotate shaft 118 allowing selsyn 98 to pivot downward and engage wheel 102 with drive disc 89. A tension spring 126 is disposed between lifter shaft 118 and armature 123 and is adapted to raise the armature, thus dis-engaging integral wheel 102 except at such time as spring tension is overcome by activation of solenoid 124.

The solenoid 124 may be controlled by a switch (see Fig. 5), as will hereinafter be described, and is under automatic control by safety microswitch 127. Safety microswitch 127 and indicator microswitch 128 are mounted on a framework 129 which is secured to base member 57, the microswitches being disposed above rectangular way 59 on either side of the plane of integral wheel 102 and with indicator microswitch 128 rearmost. Actuating leaf 131 extends from the underside of indicator microswitch 128 in a forward direction, and carries trip wheel 132 on the underside of its free extremity, the axis of wheel 132 lying in the plane of integral wheel 102. Second actuating leaf 133 projects rearwardly from the underside of safety microswitch 127, its free extremity being above and slightly separated from the extremity of leaf 131.

Pawl base block 134, mounted on trolley 64 parallel to and above rectangular way 59, has an upwardly projecting pawl 136 disposed at each extremity. The pawls 136 are so placed as to raise trip wheel 132 when trolley 64 is displaced sufficiently far that integral wheel 102 has reached the periphery of wear plate 91. Upward movement of trip wheel 132 will first actuate indicator microswitch 128 which is adapted to light a warning lamp 137, mounted at the top of integral selsyn 98, and is further adapted to turn off the analyzer drive as will hereinafter be described. Further upward movement of trip wheel 132 will actuate safety microswitch 127 which is adapted to deactivate solenoid 124 and thus raise integral wheel 102 from wear plate 91.

Reference is now made to the multiplier unit 39, which is similar in construction to the other multiplier units 41, 42, 43, 44, and 46, and which will be described as a typical unit. A vertical rectangular base plate 138, as illustrated in Fig. 12, is secured to the forward portion of framework 29. Product selsyn 139 is secured by an annular mounting ring 141 to the rearmost portion of base plate 138 and is oriented in such a manner that rotor shaft 142 is horizontal and projects forward. Coaxially secured to the forward extremity of rotor shaft 142 are nine spur gears having a uniformly diminishing number of teeth and arranged in a conical cluster 143 with the largest gear most adjacent product selsyn 139.

Bracket 144 projects outward from base plate 138 in front of product selsyn 139. Horizontal pivot shaft 146 is disposed parallel and adjacent to base plate 138 and passes through bore 147 in bracket 144 and through bore 148 in the upper portion of mounting ring 141. Coaxially disposed on the rear portion of pivot shaft 146 is a compression spring 149. One extremity of spring 149 abuts mounting ring 141 and the opposite end abuts against an annular stop 151 which is secured to the rear extremity of shaft 146; spring 149 thus being adapted to exert a rearward longitudinal force on shaft 146.

A second annular mounting ring 152 secures multiplicand selsyn 153 to the central portion of pivot shaft 146, the rotor shaft 154 of multiplicand selsyn 153 being parallel to pivot shaft 146 and being directed rearward. A drive gear 156 is coaxially secured to the end of rotor shaft 154 and is adapted to be meshed with any one of the gears 143 of product selsyn 139 inasmuch as pivot shaft 146, which carries selsyn 153 and gear 156, may be rotated and longitudinally translated, as shown in the shadow portion of Fig. 12.

There is provided a vertical front panel 157, a portion of which is shown in Fig. 13, secured to framework 29 and extending over the forward face of the multiplier assemblies, and having aperture 158 through which the forward extremity of pivot shaft 146 projects. An angled handle 159 is secured to the forward extremity of pivot shaft 146 and serves to facilitate manual rotation and translation thereof. Pointer 161 projects radially from the forward end of shaft 146, in a generally upward direction, and a dial 162 is mounted on panel 157 behind the pointer. Dial 162 is provided with graduations which, in conjunction with pointer 161, indicate which gear 143 is in mesh with drive gear 156. To facilitate reading, dial 162 has a helical front surface inasmuch as shaft 146 is displaced as it rotated.

As illustrated in Fig. 14, there is provided means for maintaining drive gear 156 in mesh with any gear 143 without resting the weight of multiplicand selsyn 153 on the gear assembly. Angled support arm 163 projects generally upward from pivot shaft 146 in front of bracket 144, and is adapted to bear against a stepped platform 164. Platform 164 has the shape of a solid sector of gear cluster 143 and is mounted on the forward face of bracket 144 in such a position that as arm 163 is caused to rest upon any of the steps, gear 156 will be meshed with the corresponding gear of cluster 143.

It will be observed that the use of a finite number of gears, in this instance nine, limits the multiplication process to a small number of possible multiplying factors. As will hereinafter be described, the principal function of the multiplier units is to scale coefficients to values adaptable to the integrators. Accordingly, only a limited number of multiplying factors are required. In the present instance, it has been found satisfactory to employ nine gears having decreasing pitch diameters such that speed reductions from one tenth to nine tenths may be effected.

Considering now adder 53, which is typical of the four adder units (see Fig. 3), an addend differential-selsyn 167 is secured to plate 166 with its rotor shaft 168 horizontal and projecting to the rear. Sum selsyn 169 is mounted on plate 166 to the rear of addend selsyn 167, and its rotor shaft 171 is directly coupled to the rotor shaft 168 of the addend selsyn. It is to be observed that the rotor of a differential selsyn will rotate an amount equal to the algebraic sum of the rotor rotations of any two selsyns connected with its input terminals. Thus addition may be achieved since the rotor of sum selsyn 169 will rotate an amount equal to the combined rotor rotations of any two selsyns connected with the addend differential-selsyn 167.

Figure 2:
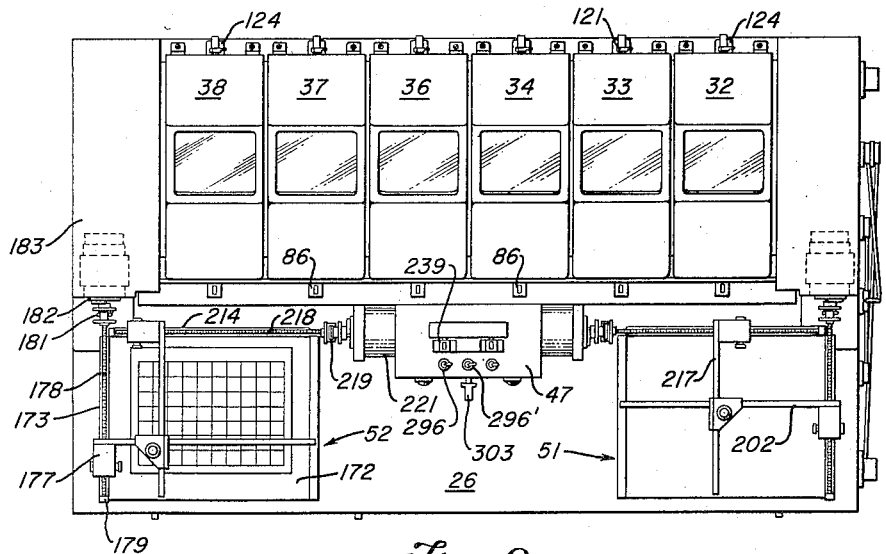
Figure 2 is a plan view of the analyzer further clarifying the structure thereof.

There are provided plotting tables 51 and 52, plotting table 52 being a mirror image of plotting table 51, as shown in Fig. 2. The plotting tables 51 and 52 may be used as input means by manually following a graph in order to feed a mathematical expression into the analyzer, or they may be used as output means producing a graph of the relationship between any two shaft rotations. As shown in Fig. 15, a plotting board 172 is disposed over the forward corner of table 26 in front of integrators 37 and 38 and is mounted between two lateral supports 173 and 173' which are secured to table 26 and aligned normal to the forward edge thereof. To accomplish plotting of ordinate values on board 172, an ordinate plotting assembly is disposed adjacent support 173. Support 173 projects above the level of board 172 and has right angled rabbets 176 and 176' cut into each of its upper edges to form ways along which ordinate guide trolley 177 travels. To drive trolley 177, a lead screw 178 is disposed above and parallel to support 173. One extremity of the lead screw 178 is retained by a bearing 179 secured to the forward end of support 173, and the rear extremity is connected through an adjustable friction coupling 181 to the rotor of ordinate drive seslsyn 182. The drive selsyn 182 is secured to table 26 at the rear of support 173 and is enclosed by a protective housing 183.

A bore 184 is provided in trolley 177 and the lead screw 178 is extended therethrough (see Fig. 17). A second bore 186 transpierces trolley 177 at right angles to bore 184 and intersects therewith. Slidably disposed within the second bore 186 is a hollow release cylinder 187 which protrudes from trolley 177 on the side of board 172 and which has opposed slots 188 through which the lead screw 178 extends. A threaded half-nut 189 is secured within the interior extremity of release cylinder 187 and is adapted to engage lead screw 178 when the cylinder 187 is translated in the direction of board 172.

To provide means for maintaining half-nut 189 in engagement with the lead screw 178, and for temporary disengagement, a finger button 191 is mounted in the protruding extremity of the release cylinder 187 and a similar button 192 is mounted in the opposite entrance to bore 186. A pressure block 193, of relatively soft material, is slidably disposed with release cylinder 187 and is maintained in abutment with the lead screw 178 by a compression spring 194 which is contained within the cylinder between block 193 and button 191. As may be seen, spring 194 will force release cylinder 187 in the direction of board 172 and maintain half-nut 189 in engagement with the lead screw 178 except at such time as manual pressure on buttons 191 and 192 overcomes the spring's tension.

Three guide wheels 196, 197, and 198 (see Fig. 18) are secured to the underside of trolley 177 to engage the rabbeted upper face of support 173 in such a manner as to prevent rotation of the trolley 177 about lead screw 178. Wheels 196 and 197 are mounted on the side of support 173 most adjacent board 172 and bear on the vertical face of rabbet 176. Wheel 198 is secured to an adjustable mounting 199 set in a recess 201 on the underside of trolley 177, and bears against the vertical face of rabbet 176′. Thus it is seen that, as illustrated in Fig. 16, rotation of the lead screw 178 will move the trolley 177 along support 173 and will translate an ordinate plotting arm 202 which projects from trolley 177 across board 172.

As a safety means adapted to prevent the trolley 177 from over-riding the lead screw 178, and to limit movement of plotting arm 202 to the area of board 172 upon which it is desired to plot data, an elongated recess 203 (see Fig. 20) is provided in the edge of board 172 adjacent each extremity of support 173. A trip rod 204 is disposed beneath board 172 and has upwardly curved ends which project through the recesses 203; the trip rod being supported by pins 206 which project laterally from the upwardly curved ends and rest upon the horizontal face of rabbet 176. Microswitch trip plate 207 is adjustably positioned midway along the length of trip rod 204 and is provided with a central aperture 208. A microswitch 209 is secured to the underside of board 172 with trip lever 211 projecting forward and carrying a wheel 212 which normally seats in aperture 208.

Upon reaching either extremity of lead screw 178, trolley 177 will strike the upwardly curved portion of trip rod 204 and displace plate 207 from its central position. Such displacement will eject wheel 212 from aperture 208, thus opening microswitch 209 which is adapted to cut off the analyzer drive as shall hereinafter be described. To restore trip rod 204 to its central position, an arcuate leaf spring 213 is secured to each curved portion of the rod in such a manner as to project upward through recesses 203.

A rabbeted support 214, as illustrated in Fig. 15, similar in structure to support 173, is disposed adjacent the rearmost edge of board 172. To plot abscissa values, a trolley assembly 216, of structure similar to ordinate trolley 177, is adapted to travel along support 214 and translate an abscissa plotting arm 217 across board 172. Motion of the trolley 216 is controlled by a lead screw 218 connected through a friction coupling 219 with abscissa drive selsyn 221 which is secured to table 26 adjacent counter housing 47; the structure of the mechanism being similar to that described for the ordinate plotting assembly. A microswitch 222 and trip rod 223, similar to those described, are adapted to limit motion of the trolley 216 to the desired area of board 172.

Stylus means 224 for tracing a graphical record of the relative rotation of the ordinate and abscissa shafts, and for manually following a graph to feed data into the analyzer is supported by ordinate plotting arm 202 and abscissa plotting arm 217 having wheels 226 secured to their free extremities and adapted to ride upon board 172. As shown in Figs. 19 and 20, a stylus carriage 227 has two mutualy perpendicular grooves 228 and 229 on its underside, one groove 228 being cut to a different level than the other. Carriage 224 rides upon the transversion of plotting arms 202 and 217 by disposition of ordinate arm 202 in groove 229 and by disposition of abscissa arm 217 in groove 228.

Stylus carriage 224 mounts an upright stylus retainer cylinder 231 which is open at its upper extremity and which has a small axial pen retaining aperture 232 in its lower extremity, the lower extremity being preferably made from transparent material to aid in manually tracing a graph. A conventional lettering pen 233 may be disposed in aperture 232 to trace a graph on a paper blank 234 secured to board 172. To provide accuracy when it is desired to manually follow a graph to put data into the analyzer, a sighting member 236 is slidably disposed within retainer cylinder 231 and provided with a sighting aperture 237 coaxial with pen retainer aperture 232.

As will hereinafter be described, ordinate drive selsyn 182 and abscissa drive selsyn 221 and their associated plotting mechanisms may be driven manually for input purposes or may be utilized as output means by synchronous connection with any other two selsyns in the analyzer.

Inasmuch as numerical quantities in the analyzer are expressed as shaft rotations, it is desirable to have some means of recording the motion of any shaft in order to extract a useful reading therefrom. Accordingly, two shaft rotation counter assemblies are mounted in housing 47 and means are provided whereby they may be caused to register the rotor motion of any two selsyns in the analyzer. To accomplish the foregoing there is provided conventional mechanical digital register 239 (see Figs. 21 and 23) secured to the top of housing 47; register 239 having the dial face uppermost and actuating shaft 241 extending rearward into a rectangular gear box 242. A counter selsyn 243 is mounted within housing 47 and aligned such that its rotor shaft 244 projects upward into gear box 242. Within the gear box 242, a first bevel gear 246 is secured to rotor shaft 244 and is engaged with a second bevel gear 247, mounted on actuating shaft 241, causing the selsyn 243 to turn the register 239. As will hereinafter be described, counter selsyn 243 may be connected with any of the selsyns in order to record the shaft rotation of the latter.

Set-up of the analyzer to solve a differential equation requires the inter-connection of selsyns so that the rotor motion of any one selsyn bears some mathematical relationship to the rotor motion of the remainder. It will be apparent, however, that no motion will take place unless external drive is applied to at least one of the selsyns in the system.

Inasmuch as the independent-variable selsyn of an integrator unit provides the basic motion to which all other integrator shaft motions must be related, it is usually selected to receive the external drive. As shown in Fig. 3, the independent-variable drive assembly 248 comprises a master selsyn 249 mounted under table 26 with its rotor shaft 251 projecting through an aperture in control panel 49. A reversible variable-speed A. C. motor 252 is mounted under table 26 and adapted to drive selsyn 249 by means of pulleys 253 and 254 secured to the shafts of motor 252 and selsyn 249 respectively. A knob 256 is secured to the forward extremity of selsyn rotor shaft 251 in front of panel 49 for use when it is desired to manually rotate selsyn 249. A variable auto-transformer 257 is disposed under table 26 and adapted to control the speed of motor 252, the control handle 258 being disposed on panel 49 behind knob 256. As shall hereinafter be described, independent-variable drive selsyn 249 may be connected with one or more selsyns to provide drive to the system.

As has been described, it will sometimes be necessary to feed data into the analyzer by manual control of the plotting table selsyns or it may also be necessary to provide a differential selsyn with excitation voltage of zero rotation, and there is provided a hand-crank selsyn assembly 259 which is adapted to perform either of these functions (see Fig. 4). A crank selsyn 261 is mounted beneath the forward portion of table 26 with its rotor shaft 262 projecting through an aperture in control panel 49. Hand crank 263 is secured to the forward extremity of rotor shaft 262, and a suitable clamp 264 is provided to lock it in fixed position when zero excitation voltage is required. As shown in Fig. 1, two additional hand-crank selsyn asemblies 266 and 267 are disposed under table 26 adjacent control panel 49. Each of such crank selsyns may be connected with a plotting table drive selsyn or with any differential selsyn requiring zero excitation voltage.

Reference has previously been made to means for inter-connecting the various selsyns in the particular pattern required by each problem and, as illustrated in Fig. 4, the plugboard 56 is provided to facilitate such inter-connection. Two of the leads from each selsyn stator terminate at a two-conductor plug receptacle, such as receptacles 268 disposed on plugboard 56; the remaining lead being grounded to a common conductor. Electrical coupling of any two selsyns may be achieved by connecting the corresponding plug receptacles with a two-conductor patching cable 269.

To simplify the patching operation, related plug receptacles are grouped on the face of plugboard 56; as for example, multiplier selsyn receptacles are disposed in two adjacent vertical columns 271 and 272, one of the columns 271 containing the multiplicand or input receptacles, and the other column 272 containing the product or output receptacles.

The direction of rotation of a selsyn shaft in the analyzer is indicative of the algebraic sign of the quantity it represents. Accordingly, the leads to all plug receptacles 268 must be uniform in order that direct connection of two receptacles will produce identical rotation of their respective selsyn shafts. A one hundred and eighty degree rotation of one terminal plug 273 of a patching cable 269 before insertion in a plug receptacle 268 will cause the slaved selsyn to rotate in a reverse direction from the driving selsyn and thus represent a minus quantity. The terminal plugs 273 are preferably of the T-tap variety in order that the polarity of each connection may be more easily controlled; thus when a terminal is reversed before insertion, the condition will be immediately apparent inasmuch as cable 269 will emerge from the top of the terminal. The use of such terminal plugs will permit a plurality of selsyns to be patched to a single plug receptacle.

Referring now again to Fig. 1, a lampboard 274 is disposed on the inside face of end panel 27 having lamp sockets 276 disposed on its face in positions corresponding to the positions of selsyn plug receptacles 268 on plugboard 56. Ballast lamps 277 are secured in sockets 276 and electrical connections are made such that each lamp is in series with the primary windings of the corresponding selsyn. The power rating of each lamp 277 is such that when the proper amount of in-phase current from the source supplies excitation voltage to the windings of a slaved selsyn, minimum glow of the lamp is visible. Increased loading of the slaved selsyn will produce greater glow in the lamp. Lampboard 274 thus serves the dual purpose of indicating operating conditions of the selsyns, and of limiting current in the event a selsyn is overloaded.

Consider now the pattern of electrical connections between the above-described components of the analyzer, as well as additional control and safety elements, and means for coupling additional computer units to the analyzer for joint operation as illustrated in Fig. 22. An A. C. supply input plug 278 is suitably provided on end panel 27 and carries first supply lead 279, second supply lead 281, and ground lead 282. One primary winding terminal 283 of each selsyn is connected with first supply lead 279 through a common fuse 284 which is monitored by a lamp 286. The remaining primary winding terminal 287 of each selsyn is connected with second supply lead 281. A ballast lamp 277 is connected in series with the primary winding of each selsyn as was previously described, and a power factor correcting capacitor 288 is connected in parallel with each such winding. As shown in Fig. 3, the capacitors 288 are mounted in a framework 289 beneath the rearmost portion of table 26.

Referring now again to Fig. 22, first lead 291 and second lead 292 from the secondary winding of each selsyn are connected to the corresponding plug receptacle 268 on plugboard 56; the third lead 293 being connected to a common conductor 294. Secondary leads 291' and 292' to the independent-variable drive selsyn 249 are connected with their plug receptacle 268' in series with nine double pole counter setting toggle switches 296, of which three are shown. Swingers of the counter setting switches 296 are spring returned to a normal position in which circuit continuity exists between the selsyn 249 and the plug receptacle 268'. As shown in Fig. 1, each switch 296 is disposed adjacent an integrand shaft revolutions counter 86 or shaft rotation counter 238, an extra switch 296' being provided on counter housing 47, the connections of which will be described hereinafter. In actuated position, each switch 296 is adapted to connect the independent-variable drive selsyn 249 to the selsyn driving the counter corresponding to such switch in order to set the counter at a desired reading prior to a problem solution.

To supply current to the independent-variable drive motor 252, the first primary terminal 297 of autotransformer 257 is connected with first supply lead 279 through a fuse 298 and fuse monitor lamp 299, the remaining primary terminal 301 being connected with second supply lead 281.

First swinger 302 of a two pole, three position motor control switch 303 is connected to autotransformer first terminal 297 in series with first drive motor field winding 304 and normally open safety relay contacts 306, the second swinger 307 being connected to autotransformer center tap terminal 308 in series with second field winding 309. In the first position of motor control switch 303, the swingers 302 and 307 contact leads to drive motor armature 311. In the second position, swinger connections with armature 311 are reversed to produce reversed operation of the drive motor 252. In either setting of the switch, ballast lamp 312 is disposed in series with the armature circuit. The switch 303 is primarily adapted to control motor 252 during operation of counter setting switches 296, therefore the swingers 302 and 307 are spring returned to a third or central position where they are connected with first swinger 313 and second swinger 314 respectively of a three pole, three position, analyzer control switch 316.

Swingers 313 and 314 of analyzer control switch 316 operate drive motor 252 when motor control switch 303 is in its normal center position, the third swinger 317 being adapted to energize certain other circuits to be hereinafter described. In the first position, swingers 313 and 314 contact leads to armature 311. In the second position, swinger connections to armature 311 are reversed. The third or center position is open or non-contacting for all swingers. Analyzer control switch 316 is thus adapted to start the analyzer drive system in either a forward or reverse direction.

Considering now the integrator solenoid circuits, the primary of voltage control autotransformer 318 is connected across the supply leads 279 and 281 in series with tilt relay contacts 319 and a fuse 321 which is monitored by a lamp 322. A "wheels down" indicator lamp 323 which is disposed on console 48 and duplicated on plugboard 56, is connected across second supply lead 281 and the primary of transformer 318. Each solenoid 124 is connected across the secondary leads 324 of autotransformer 318 in series with a safety microswitch 127. Upon being actuated, any of the microswitches 127 will disconnect the associated solenoid 124 and connect a tilt indicator lamp 326 across the secondary 324 of the transformer 318, the lamp being disposed on the face of console 48.

Indicator microswitches 128, plotting table microswitches 209 and 222, and a safety relay coil 327 are connected in series across supply leads 279 and 281 through fuse 298. Operation of any of the microswitches, by virtue of a computer element exceeding its limits, will open the described circuit and connect warning lamp 137 across the supply leads 279 and 281. Opening of the circuit through safety relay coil 327 will cause safety relay contacts 306 to open, thus stopping drive motor 252. Deactivation of the safety relay coil 327 also closes normally closed relay contacts 328 closing a circuit from supply lead 279 through fuse 321 and "use hand crank" indicator lamp 329 to supply lead 281, the lamp being disposed on the face of console 48.

Third swinger 317 of analyzer control switch 316 is connected with second supply lead 281 in series with a tilt relay coil 331. In either the first or second position, swinger 317 is connected with first supply lead 279 through fuse 321, the third or center position being off or non-contacting. Thus manipulation of analyzer control switch 316 to either the forward or reverse position will actuate tilt relay coil 331 which closes tilt relay contact 319 and supplies current to autotransformer 318. In its open position, tilt relay contact 319 is connected across supply leads 279 and 281 in series with a "wheels up" indicator lamp 332 which is mounted on console 48 and duplicated on plugboard 56 to signify that the solenoid circuit is open and all integral wheels 102 are lifted.

A double pole power on-off switch 333 is disposed in series with supply leads 279 and 281 between supply current input plug 278 and the fuses 284, 298, and 321. Power on-off indicator lamp 334 is connected directly across the leads 279 and 281 and mounted on control panel 49.

Inasmuch as different problem solutions will require varied quantities and combinations of computer mechanisms, it may sometimes be desirable to couple additional computer mechanisms into the system. Accordingly, connections are disposed on the plugboard to enable a remotely situated integrator unit 336 to be coupled into the system. The remote integrator 336 is similar in structure to the previously described mechanisms and preferably employs a differential integrand seisyn 337 for greater capacity. The leads 338 to the remote integrator, including the leads 339 to remote microswitches 127' and 128', are terminated at a nineteen pin plug receptacle 341 mounted on plugboard 56 and may be connected with remote integrator 336 through a nineteen conductor cable; each lead 342 in the cable being shown separately in Fig. 22, and in the individual circuits where they occur. Included in the cable are leads 342' connecting the remote selsyns with plug receptacles 268' mounted on plugboard 56 so that patching may be performed in the same manner as for the internally contained integrators. One of the previously described counter setting switches 296' is adapted to connect independent-variable selsyn 249 with remote integrator 336 for the purpose of initial setting.

Inasmuch as all integrator indicator microswitches 127 are connected in series, provision for circuit continuity must be made when the analyzer is operated without a remote integrator. A two conductor plug receptacle 343 is mounted on plugboard 56 and connected in parallel with remote indicator microswitch 128'. When the analyzer is operated without a remote integrator, a two-pin blind plug 344 is inserted in the receptacle 343 to complete the microswitch circuit.

To achieve still further capacity in the handling of problem solutions, provision is made for the operation of two complete analyzers as a single unit. With the two analyzers juxtaposed, computer elements may be electrically interconnected by patching between the two plugboards in the same manner as is done for single unit operation. When elements of two separate analyzers are to be thus operated jointly, certain further interconnections must be made.

First, it is desirable that both analyzers operate from a common power source to insure that voltage supplied to both units is identical in amplitude and phase. Accordingly, a three conductor dual unit power supply plug receptacle 346 is mounted on plugboard 56 with one pin grounded and the second and third connected with supply leads 279 and 281 respectively. In dual operation, one analyzer only is connected to the external power supply and the two plug receptacles 346 are connected by a three-conductor cable (not shown) to supply power to the second unit.

Secondly, it is necessary that certain elements of both analyzers be operated in a series relationship, and because of the difficulty of synchronization, one independent-variable drive system must be used to drive both units. To provide the necessary connections, a seven pin dual operation plug receptacle 347 is mounted on plugboard 56. In Fig. 22, pin connections to the plug receptacle 347 are shown in the individual circuits in which they occur and are shown with a blind plug 348 engaged as is done when the analyzer is operated as a single unit.

First pin 349 and second pin 351 are disposed in the indicator microswitch series circuit, first pin 349 being connected with fuse 298 and second pin 351 being connected with the first microswitch 209. In single unit operation, circuit continuity is established by a pin jumper 352 in blind plug 348. In a similar manner, third pin 353 and fourth pin 354 are disposed in the same series circuit, third pin 353 being connected with the final microswitch 128' and fourth pin 354 being connected with safety relay coil 327 and with circuit continuity being made during single unit operation by a pin jumper 356 in blind plug 348.

In dual operation, the plug receptacles 347 of the two analyzers are connected by a five conductor cable (not shown). In the cable, connections are such that first pin 349 of the controlling analyzer is connected with second pin 351 of the second analyzer, second pin 351 of the controlling unit is connected with third pin 353 of the second unit, and the third pin 353 and fourth pin 354 of the controlling unit and the fourth pin 354 of the second unit are all provided with a common connection.

In dual operation, the analyzer control switch 316 of the second unit must be maintained in the center or "off" position to prevent its independent-variable drive from operating. It is then necessary to provide means for powering tilt relay 331 in order to energize the solenoid circuit. Accordingly, fifth pin 357 and sixth pin 358 are disposed in the circuit from tilt relay coil 331 to analyzer control switch 316, the fifth pin being connected with the coil and the sixth pin being connected with third swinger 317 of the switch.

In single unit operation, the fifth and sixth pins 357 and 358 are connected through a jumper 359 in blind plug 348 in order to establish circuit continuity. In dual operation, the fifth and sixth pins 357 and 358 are similarly connected together and in addition, are connected through the cable with the fifth pin of the second unit, thus interlocking the two solenoid circuits.

The remaining seventh pin 361 of receptacle 347 is connected with common selsyn conductor 294 and, in dual operation, is connected through the cable to the corresponding conductor of the other analyzer.

Considering now the operation of the analyzer as a single unit, and without a remote integrator, power on-off switch 333 and analyzer control switch 316 are opened and A. C. input plug 278 is connected with a source of current. Closure of power switch 333 will then ready the analyzer for problem set-up.

The particular mathematical expression to be evaluated is put into integral form, and from a study of the mathematical operations required, a sequence of computer mechanism interconnections is determined. The technique of determining the pattern of computer mechanism interconnections for a particular problem is well understood within the art and is amply disclosed in the literature. Such treatments employ conventionalized symbols to represent the computer mechanisms and shaft connections, and are applicable to any differential analyzer regardless of its particular structure. Inasmuch as such treatments are fully adaptable to the present invention, this discussion will be confined to the mechanics of this particular device and will not attempt to set forth the theoretical principles governing problem set-up in all computers of the differential analyzer class.

Setting of initial integrator drive disc displacements, to conform with the parameters of the integrals, is accomplished by operating direction control switch 303 in conjunction with counter setting switches 296, the resulting drive disc displacements being registered on integrand shaft revolution counters 86. In the event the values assigned a particular integrator will result in the mechanism exceeding its working range, input to the integrator may be channeled through a multiplier 39 and reduced by a suitable scale factor.

As has been previously described, patching of selsyns to establish the required shaft couplings is accomplished by insertion of patching cables 269 into the appropriate plugboard receptacles 268. It has been pointed out that no rigid scheme of selsyn interconnection can be described as applying to all problem solutions. For the purpose of illustration, however, a general pattern of connections to a single integrator, which may be regarded as typical of most set-ups, is as follows:

Considering a representative integrator unit 32, external drive representing the independent-variable will be patched from drive selsyn 249 to independent-variable selsyn 62, thus operating drive disc 89. Concurrently, drive disc displacement is controlled by patching integrand selsyn 71 to either a manually controlled hand crank selsyn 261 or to the output selsyn of a further combination of computer elements which is generating a required function. Integral selsyn 98, representing the integrated function, may be patched to the input selsyn of another combination of computer elements for further mathematical operation, or may be patched to a counter selsyn 243 or plotting table selsyn 182 should it represent the final solution.

The above description is indicative of a portion of the selsyn connections required in the evaluation of a single term of an equation. Inasmuch as the equation will usually consist of several terms, similar connections to several groups of integrators will be made and the results combined by patching the respective output selsyns to the input selsyns of adders 53.

Multiplication of a term by a coefficient is achieved by setting the independent-variable drive disc of an integrator at the appropriate fixed displacement; the chief function of the multipliers 39 being to scale down mathematical expressions to values within the limits of the integrator units.

Where a mathematical function is not readily adaptable to internal generation by the analyzer, a plotting table 52 and hand crank 263 may be used to manually feed the function into an integrator as the process of evaluation is carried out. A graph of the function is traced on a paper blank 234 which is then mounted on plotting board 172. By depression of finger buttons 191 and 192, plotting arms 202 and 217 may be rapidly translated in such a manner as to set sight 237 over the initial limit point of the graphed function. Abscissa selsyn 221 is patched to independent-variable selsyn 249 and ordinate selsyn 182 is patched to hand crank selsyn 261 and to the integrand selsyn 71. As the independent-variable drive translates sight 237 along the abscissa axis, the operator supplies the ordinate value to the integrand selsyn by manually rotating hand crank 263 to maintain sight 237 on the graphed function.

To register the result or output of an evaluation, the final output selsyn in the sequence of computer elements may be patched to a shaft revolutions counter selsyn 243 or to the ordinate selsyn 182 of a plotting table 51. In using a plotting table as an output recording means, it will usually be desirable to plot the output shaft rotation against the independent-variable shaft rotation in order to produce a continuous graph of the integrated equation. In such an arrangement, the abscissa selsyn 221 will be patched to the independent-variable drive selsyn 249.

When all computer and accessory elements are patched in such a manner as to constrain the analyzer to evaluate the equation, operation of the analyzer control switch 316 will lower all integral wheels 102 and start independent-variable drive motor 252, thus setting the analyzer into operation. If manual input is being used, the operator may regulate independent-variable drive speed by control handle 258, slowing the analyzer when the graphed curve becomes steep or intricate and difficult to follow.

As has been described, any integrator or plotting table which approaches the limits of its mechanical working area will trip its indicator microswitch 128, cut off the independent-variable drive, and in the case of an integrator, light warning lamp 137. All such cut-off points are arranged so that the operator may continue the problem solution, by manually turning independent-variable knob 256, in cases where only a small amount of further travel of the mechanism is required. In the event the manual operation should drive the mechanism to its absolute limit, safety microswitch 127 will act to lift the integral wheel 102 and invalidate the solution.

As has been described, a remotely situated integrator unit 336 similar in construction to the remainder, may be coupled with the analyzer to extend problem handling capacity. When the cable from the remote integrator is connected with its plug receptacle 341 on the analyzer, leads from its selsyns are connected with receptacles 268 on plugboard 56 and may be patched in the same manner as the internal integrators. The limit microswitch circuit for the remote integrator is established by removing the blind plug 344 from receptacle 343.

Operation of two separate analyzers as a single computer requires the previously described connections between each duel unit power supply plug 346 and dual unit operation plug 347. With the two machines suitably juxtaposed, plugboard selsyn receptacles 268 may be patched from one machine to the other as may be required. In dual operation the controls and indicator lamps of the controlling unit serve both machines, those on the second analyzer functioning for that analyzer only.

Where two analyzers are specifically designed to be operated together, it will be found convenient to build one machine with the plugboard 56 disposed on end panel 27' rather than panel 27. The machines may then be disposed back to back or side by side with their plugboards adjacent for more convenient patching.

While the salient features of the invention have been described in detail with respect to one embodiment it will, of course, be apparent that numerous modifications may be made within the spirit and scope of the invention, and it is therefore not desired to limit the invention to the exact details shown except insofar as they may be defined in the following claims.

What is claimed is:

1. A differential analyzer comprising in combination a plugboard element having a plurality of electrical terminals disposed thereon, a plurality of mechanical integrators each having a first selsyn and a second selsyn adapted to coact with the input shafts thereof and a third selsyn adapted to coact with the output shaft thereof, each of said selsyns being electrically connected to a selected plurality of terminals on said plugboard, a plurality of multipliers each having a first selsyn adapted to coact with the input shaft thereof and a second selsyn adapted to coact with the output shaft thereof, each of said multiplier selsyns being electrically connected to a selected plurality of terminals on said plugboard, a plurality of adders each having a differential selsyn adapted to coact with the input shafts thereof and a second selsyn adapted to coact with the output shaft thereof, each of said adder selsyns being electrically connected to a selected plurality of terminals on said plugboard, a variable speed drive motor, a selsyn adapted to be driven by said drive motor and electrically connected to a selected plurality of terminals on said plugboard, a plurality of selsyns each being adapted to manual control and each being electrically connected to a selected plurality of terminals on said plugboard, a plurality of rotation recording means each having coacting therewith at least one selsyn electrically connected to a selected plurality of terminals on said plugboard, and a plurality of electrically conducting cables adapted to make connections between selected terminals on said plugboard whereby driving impulses may be transmitted from said drive motor and said manually controllable selsyns through a selected sequence of said integrators and said multipliers and said adders to said plurality of recording means in accordance with a mathematical expression to be evaluated.

2. A differential analyzer substantially as described in claim 1 and further characterized by a multi-conductor plug receptacle, a second plurality of terminals disposed on said plugboard, said second plurality of terminals being electrically connected with individual conductors of said multi-conductor plug receptacle, and a multi-conductor cable adapted to electrically connect the conductors of said multi-conductor cable with the selsyns of a remotely situated integrator whereby said remotely situated integrator may be utilized in a manner similar to said previously recited integrators through the interconnection of terminals on said plugboard by means of said conducting cables.

3. A differential analyzer substantially as described in claim 1 and further characterized by an additional plug receptacle, and an additional conducting cable, said plug receptacle and said cable being adapted to electrically connect the selsyn primary windings of said differential analyzer in parallel with the selsyn primary windings of a second similar differential analyzer whereby connections may be made between terminals on the plugboards of the two analyzers so that the two analyzers may be operated as a single computer.

4. A differential analyzer including the combination of a plugboard having a plurality of electrical plug receptacles, a plurality of integrators having selsyns adapted to coact with the input and output shafts thereof, each of said selsyns having its control leads terminated at an individual one of said plug receptacles, a plurality of multipliers of the class having an input shaft driving an output shaft through a selectable drive ratio, said multipliers having selsyns coacting with the input and output shafts thereof, each of said multiplier selsyns having its control leads terminated at an individual one of said plug receptacles, a plurality of adders having selsyns adapted to coact with the input shafts thereof, each of said adder selsyns having its control leads terminated at an individual one of said plug receptacles, at least one flat plotting table, an abscissa guide arm disposed across said plotting table and adapted to be translated thereacross by a lead screw, an abscissa drive selsyn adapted to coact with said lead screw and having control leads terminated at an individual one of said plug receptacles, an ordinate guide arm disposed across said plotting table normal to said abscissa guide arm and adapted to be translated across said plotting table by a second lead screw, an ordinate drive selsyn adapted to coact with said second lead screw and having control leads terminated at an individual one of said plug receptacles, a stylus element adapted to ride across the surface of said plotting table upon the intersection of said abscissa plotting arm and said ordinate plotting arm, hand-cranked means for manually driving at least one of said abscissa selsyns and said ordinate selsyns, motor-operated means for driving at least one of said abscissa selsyns and said ordinate selsyns, and a plurality of patching cables adapted to connect any of said plug receptacles with at least one other of said plug receptacles whereby drive may be routed from said motor-operated means and said hand-cranked means to a selected sequence of said integrators and said multipliers and said adders to at least one of said abscissa selsyns and said ordinate selsyns in accordance with the operations required to evaluate a given mathematical expression.

5. A differential analyzer comprising in combination a plugboard having a plurality of electrical terminals disposed thereon, a plurality of computer mechanisms adapted to perform basic mathematical operations, said computer mechanisms being of the class which receive and transmit quantities by means of rotatable input and output shafts, a plurality of computer mechanism control selsyns, one each of said control selsyns being adapted to coact with one each of said rotatable shafts, said selsyns having their primary terminals connected in parallel to a source of electrical power and having at least two of their secondary terminals electrically connected with selected terminals of said plugboard, at least one input selsyn having electrical connections similar to said control selsyns and being adapted to be manually operated, at least one output selsyn, said output selsyn having electrical connections similar to said control selsyns and being adapted to drive a recording means, an independent-variable drive motor, an independent-variable selsyn adapted to be driven by said motor and having electrical connections similar to said control selsyns, and means for selectively connecting terminals on said plugboard whereby drive may be channeled from said independent-variable drive motor and said manually operable input selsyn through a required sequence of said computer mechanisms to said recording means in accordance with a differential expression to be evaluated.

6. A differential analyzer substantially as described in claim 5 and having in addition to the elements recited therein, a plurality of switch means connected in series between the secondary terminals of said independent-variable selsyn and said plugboard, said switch means being adapted to temporarily connect said independent-variable selsyn with selected ones of said computer-mechanism control selsyns, whereby said independent-variable drive motor may be utilized to adjust said computer mechanisms to required initial settings.

7. A differential analyzer substantially as described in claim 5 in which a plurality of said computer-mechanisms are integrators each comprising a rotatable input disc, a rotatable output wheel disposed normal to said disc and adapted to be driven thereby, lead screw means adapted to translate said disc with respect to said wheel in such a manner as to vary the drive ratio therebetween, microswitch means adapted to be actuated when the periphery of said disc approaches the periphery of said wheel, said microswitch means of each of said integrators being connected in series and being further adapted to stop said independent-variable drive motor upon actuation of any one thereof, and means for manually operating said independent-variable selsyn apart from said drive motor whereby translation of said disc may be manually controlled to prevent over-riding of said wheel by said disc.

8. A differential analyzer as described in claim 7 and further characterized by a remotely situated integrator mechanism, said remotely situated integrator having a second plurality of selsyns adapted to coact with the input shafts and the output shafts thereof, a multi-conductor cable adapted to connect the secondary terminals of said second plurality of selsyns with selected terminals on said plugboard, said cable being further adapted to connect the primary terminals of said second plurality of selsyns with said source of electrical power and being adapted to connect the microswitch means of said remotely situated integrator in series with the microswitch means of the integrators disposed within said differential analyzer.

9. A first differential analyzer substantially as described in claim 7 and further characterized by electrical lead provisions adapted to connect the selsyn primary terminals of said first differential analyzer with the corresponding terminals of a second like differential analyzer, and further electrical lead provisions adapted to connect said microswitch means in series with the corresponding elements of said second differential analyzer whereby said first differential analyzer and said second differential analyzer may be jointly operated as a single computer by interconnection of selected terminals of the respective plugboards thereof.

10. In a differential analyzer, the combination comprising at least one rotatable input shaft having an input selsyn coacting therewith, an electrical independent-variable drive motor connected with a source of current, a master independent-variable selsyn in driven relationship with said drive motor, a plurality of independent-variable selsyns, a plurality of discs, one coaxially secured to the rotor shaft extremity of each of said independent-variable selsyns, a plurality of integral selsyns each disposed in such a manner that the rotor shaft extremity thereof projects over one of said discs, said integral selsyns being pivotably mounted and adapted to be swivelled upward from said discs, a plurality of integral wheels one secured to each rotor shaft extremity of said integral selsyns perpendicular to said discs and in driven relationship thereto, said integral wheels being adapted to drive said integral selsyn rotor shafts and being adapted to swivel about any axis normal thereto, a plurality of means for translating said independent-variable selsyns and said discs with respect to said wheels, a plurality of integrand selsyns one adapted to drive each of said translation means, a plurality of spring means, one adapted to pivot each of said integral selsyns upward in such a manner as to disengage said wheel from said disc, a plurality of solenoid means each adapted to overcome one of said spring means and lower the adjacent wheel to the adjacent disc, a first plurality of microswitches each adapted to be actuated when the periphery of one of said discs approaches the periphery of the adjacent disc, each of said first microswitches being further adapted to disconnect said drive motor from said source of current upon being actuated, means for manually operating said master independent-variable selsyn independently of said drive motor, a second plurality of microswitches each adapted to be actuated when the periphery of one of said discs reaches the periphery of the adjacent wheel, said second plurality of microswitches being further adapted to deactivate the adjacent solenoid means and thus raise said wheel from said disc, at least one output selsyn adapted to operate cyclometric means, a plugboard element mounting a plurality of electrical terminals, selected terminals on said plugboard being electrically connected with the stator terminals of each of said selsyns, and a plurality of conducting cables adapted to connect select terminals on said plugboard whereby drive may be transmitted from said drive motor through a selected sequence of said selsyns to said cyclometric means as required for the solution of a differential expression and said microswitches will act to prevent over-riding of any of said wheels by said discs.

11. An integrator comprising a base member mounting two parallel trolley ways, a trolley carriage riding along said ways, an integrand selsyn controlling translation of said trolley carriage along said ways, a flat disc rotatably mounted on said trolley carriage, an independent variable selsyn secured to said carriage in driving relationship to said disc, an integral selsyn having a rotor shaft parallel to the face of said disc, said integral selsyn being pivotably attached to said base member and being pivotable in a plane normal to said disc, an integral wheel coaxially attached to said rotor shaft of said integral selsyn in driving relationship thereto, the periphery of said integral wheel being contactable with said disc to be driven thereby, resilient means bearing against said integral selsyn to pivot said integral selsyn and said integral wheel away from said disc, and solenoid means connected to controllably pivot said integral selsyn and said integral wheel towards said disc against the action of said resilient means.

12. In a differential analyzer of the class having a plurality of selsyn operated basic computer mechanisms including integrators of the wheel and translatable disc class, an independent variable drive system comprising, in combination, a reversible variable speed electrical drive motor, a drive selsyn operated by said motor, means for connecting said drive selsyn for synchronous operation with selected ones of said computer mechanism selsyns to drive said computer mechanisms, a plurality of switch means disposed on said integrators and positioned to be tripped as any of said discs of said integrators approach the limits of translation of said discs, said switch means acting to stop said drive motor, and means for manually operating said drive selsyn where the required further travel of said integrator disc is slight.

13. In an analogue computer of the differential analyzer class an integrator mechanism and independent variable drive system therefor comprising an integrator base member provided with two spaced parallel trolley ways, a carriage riding on said ways, an integrand selsyn controlling translation of said trolley along said ways, a flat disc mounted on said carriage for rotation thereon, an independent variable selsyn mounted on said carriage in driving relationship to said disc, an integral selsyn having a rotor shaft substantially parallel to the face of said disc, said integral selsyn being pivotally attached to said base member and being pivotable about an axis parallel to said disc, an integral wheel coaxially mounted on said rotor shaft of said integral selsyn, the periphery of said wheel being contactable with the face of said disc to be driven thereby, spring means urging said integral selsyn and said wheel thereon away from said disc, solenoid means connected to pivot said integral selsyn and said wheel thereon towards said disc against the action of said spring means, a drive source supply energizing current to said independent variable selsyn, a first switch positioned to be tripped as said disc approaches the limits of translation thereof, said switch acting to inactivate said drive source and therefore said independent variable selsyn, means for manually effecting limited further travel of said disc, and a second switch positioned to be tripped by said disc at the absolute limit of travel thereof, said second switch being connected to de-energize said solenoid whereby said spring means pivots said wheel away from said disc.

14. In an analogue computer of the differential analyzer class, an integrator mechanism and independent variable drive system therefor substantially as described in claim 13 wherein said drive source comprises a remotely situated master independent variable selsyn and a reversible variable speed electrical motor coupled to said master selsyn in driving relationship thereto and said means for manually effecting further travel of said disc comprises a handcrank disposed in operating relationship to said master selsyn.

(References on following page)

References Cited in the file of this patent

UNITED STATES PATENTS

| | | |
|---|---|---|
| 1,952,303 | Bartholomew | Mar. 27, 1934 |
| 2,424,118 | Rast | July 15, 1947 |
| 2,519,262 | Lovell | Aug. 15, 1950 |
| 2,540,111 | Glover | Feb. 6, 1951 |
| 2,615,629 | Dayget et al. | Oct. 28, 1952 |
| 2,669,500 | Och et al. | Feb. 16, 1954 |

FOREIGN PATENTS

| | | |
|---|---|---|
| 23,241 | Great Britain | Oct. 19, 1906 |

OTHER REFERENCES

Keuhni et al.: A New Differential Analyzer, AIEE Technical Paper 44–16, December 1943, pages 1 to 16.

Bush et al.: A New Type of Differential Analyzer—Journal of the Franklin Institute, October 1945, pages 255 to 326.

Differential Analyzer, Electronic Industries, October 1946, page 62.

Electronic Instruments (Greenwood et al.), published by McGraw-Hill Book Co., New York, 1948, pages 36 and 37 relied on.

A Small Differential Analyzer With Ball Carriage Integrators and Selsyn Coupling (Meyerott and Briet), The Review of Scientific Instruments, vol. 20, No. 12, December 1949.

Special Devices for Differential Analyzers (Cook, Kirchmayer, and Weygandt), Electrical Engineering, vol. 69, No. 12, December 1950.

An Analog Computer Solves Complex Problems (Grandi et al.), Radio and Television News, November 1951, pages 70–71.

A Power System Analog and Network Computer (Baldini and Fugill), AIEE, Technical Paper 52–62, December 1951.